United States Patent Office 3,547,996
Patented Dec. 15, 1970

3,547,996
Dl 2 - {2 - [(β - HYDROXYPHENETHYL)AMINO]
ETHYL} - 2 - THIOPSEUDOUREA AND HYDROCHLORIDE SALT THEREOF
Milon Walker Bullock, Hopewell, N.J., assignor to American Cyanamid Comapny, Stamford, Conn., a corporation of Maine
No Drawing. Original application Oct. 5, 1965, Ser. No. 493,231. Divided and this application Sept. 22, 1967, Ser. No. 669,732
Int. Cl. C07c 129/00
U.S. Cl. 260—564      1 Claim

ABSTRACT OF THE DISCLOSURE

A method of preparing an acid salt of 2-{2-[(β-hydroxyphenethyl or substituted phenethyl)amino]ethyl}-2-thiopseudourea by contacting the corresponding α-phenyl or α-substituted phenyl 1-aziridineethanol with thiourea and a strong acid, and products resulting, is described. The products of the process are useful as intermediates in preparing anthelmintics.

---

This application is a division of application Ser. No. 493,231, filed Oct. 5, 1965, now abandoned.

SUMMARY OF THE INVENTION

This invention relates to a method of preparing substituted 2,3,5,6-tetrahydroimidazo[2,1-b]thiazoles. More particularly, it relates to the preparation of substituted 6-phenyl 2,3,5,6-tetrahydroimidazo[2,1-b]thiazoles, novel intermediates, and methods of preparing the latter.

The 2,3,5,6-tetrahydroimidazo[2,1-b]thiazoles prepared by the process of the present invention can be illustrated by the following formula:

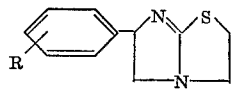

wherein R is selected from the group consisting of hydrogen, lower alkoxy, phenyloxy, lower alkyl, phenyl, halogen, nitro and lower alkanoylamino.

Among the intermediates directly convertible into the 2,3,5,6-tetrahydroimidazo[2,1-b]thiazoles described above are the following:

3-(β-chlorophenethyl)-2-iminothiazolidine;
3-[β-chloro-4-methoxyphenethyl]-2-iminothiazolidine;
3-[β-bromo-4-methoxyphenethyl]-2-iminothiazolidine;
3-[β-chloro-4-phenoxyphenethyl]-2-iminothiazolidine;
3-[β-chloro-4-methylphenethyl]-2-iminothiazolidine;
3-[β-bromo-3-ethylphenethyl]-2-iminothiazolidine;
3-[β-chloro-4-phenylphenethyl]-2-iminothiazolidine;
3-[β-chloro-4-chlorophenethyl]-2-iminothiazolidine;
3-[β-chloro-3-bromophenethyl]-2-iminothiazolidine;
3-[β-chloro-4-nitrophenethyl]-2-iminothiazolidine;
3-[β-chloro-4-acetylaminophenethyl]-2-iminothiazolidine
3-[β-bromo-4-propionylaminophenethyl]-2-iminothiazolidine and the like.

In preparing the 2,3,5,6-tetrahydroimidazo[2,1-b]-thiazoles by the process of the present invention the 3-[β-halo-3-phenethyl or substituted phenethyl]-2-iminothiazolidines are contacted with an alkali metal or alkaline earth metal hydroxide or carbonate in the presence of an organic solvent. The reaction is usually carried out at a temperature within the range of from 40° to 120° C. for a period of from about 10 minutes to 3 hours depending upon the temperature at which the reaction is carried out. Solvents such as chloroform, ethylene chloride, ethyl acetate, etc. can be used.

Alternatively the 2,3,5,6-tetrahydroimidazo[2,1-b]thiazolium salts can be prepared by heating a solution at the 3(β-chlorophenethyl)-2-iminothiozolidine in a solvent in the absence of excess base.

The 3(β-halophenethyl or substituted phenethyl)-2-iminothiazolidines are prepared from the corresponding 2-imino-α-phenyl or substituted phenyl-3-thiazolidineethanols by reaction with thionyl chloride, phosphorus trichloride, phosphorus tribromide, phosphorus oxychloride or other agents well known to those skilled in the art for transforming alcohols to halides. The reaction is usually carried out by mixing the intermediate with the halogenating agent and heating at a temperature within range of 40° to 120° C. for 5 minutes to 4 hours.

The 2-imino-α-phenyl or substituted phenyl-3-thiazolidineethanols are prepared by contacting an α-phenyl or substituted phenyl-1-aziridineethanol with thiocyanic acid followed by treatment with a strong acid. The thiocyanic acid is usually prepared in situ by the acidification of any ammonium or metal thiocyanate salt. The 2-imino-α-phenyl-3-thiazolidineethanols can also be prepared by reacting α-phenyl or substituted phenyl-1-aziridineethanol with thiourea and a strong acid followed by heating.

The α-phenyl or substituted phenyl-1-aziridineethanol can be prepared by a reaction of styrene oxide or substituted phenyl ethyleneoxide with ethyleneimine in an aqueous alkaline mixture as described by Funke et al. Bull Soc. Chim., France, 1953 (1201–3).

The process of the present invention starting with known reactants can be illustrated by the following flowsheet.

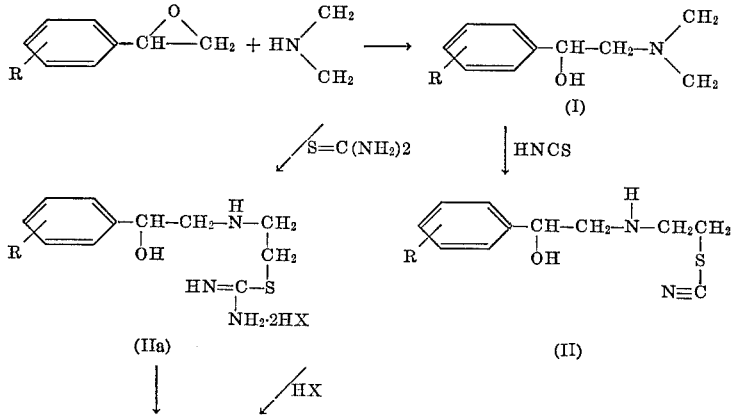

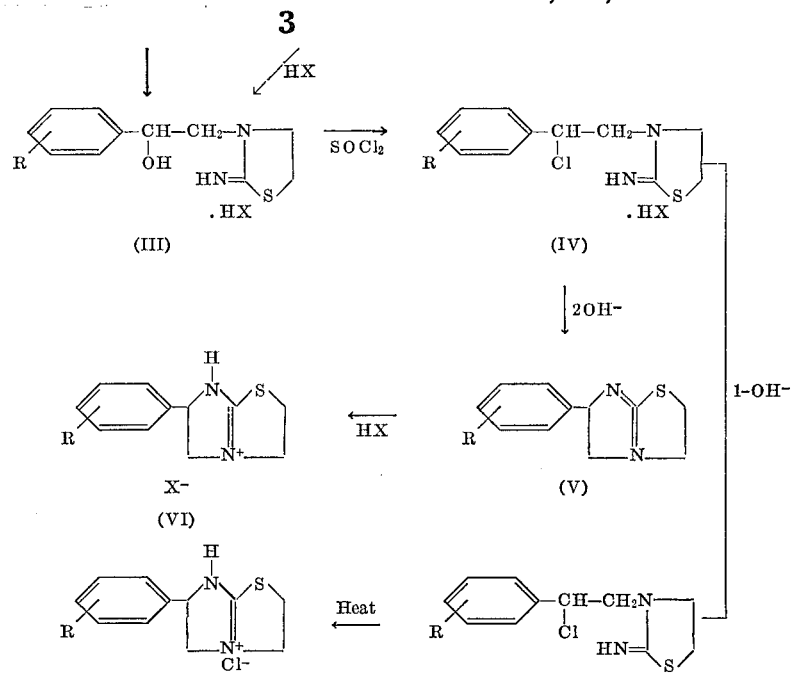

wherein R is as defined above, and X is a cation.

The preparation of Compound (I) in which R is hydrogen has been described by Funke et al. as hereinbefore described. The Compounds represented by Formula I can be transformed into the Compounds of (II) by reaction of (I) with thiocyanic acid which can be prepared by the acidification of any ammonium or metal thiocyanate salt. When the Compounds of (II) are treated with a strong acid, they are immediately converted to the 2-iminothiazoline Compounds of (III). Compounds of (III) can also be prepared by reacting Compounds of (I) with thiourea and a strong acid which yields the Compounds of (IIa) which can be converted further to (III) by heating in a suitable reaction medium. The Compounds of (III) can be converted to the Compounds of (IV) by contacting (III) with thionyl chloride or other agents such as phosphorus trichloride which are known to transform alcohols to halides. When the Compounds of (IV) are contacted with a base and warmed slightly, it is transformed into the 2,3,5,6-tetrahydroimidazo[2,1-b]thiazole free bases represented by Formula V. If desired, the free bases can be converted to salts, which are represented by Formula VI, by contacting the free base with an acid.

The compounds of the present invention were tested by standard parasitological procedures for evaluating anthelmintic efficacy, i.e., (1) in most cases the "critical" test in which the number of worms eliminated in the feces following treatment is compared with the total number of worms present, i.e., the sum of those eliminated and those present at necropsy, and (2) the "controlled" test method in which the average numbers of worms present in treated animals is compared at necrospy several days after treatment with the average number present in similarly infected but untreated animals. Depending upon the host species and the particular helminth studied the infections were experimentally induced or in some cases naturally acquired. The tests showed that dl-2,3,5,6-tetrahydro-6-phenyl-imidazo[2,1-b]thiazole hydrochloride and some of its analogs are highly active against a very broad spectrum of nematode parasites of mammals and birds at low dosages, and by varied routes of administration. The following table gives illustrative representative results obtained in testing the above described imidazothiazole, and is not intended to be limiting in regard to dose ranges, routes of administration, or species of nematodes. Data refer to adult helminths unless otherwise indicated.

TABLE

| Host | Doses, mg./kg. (or other) | Route of administration | | Approximate percent average efficacy | Species of adult [1] nematode |
|---|---|---|---|---|---|
| Mouse | 100 | Oral gavage | | 100 | Syphacia, Aspiculuris. |
| | 25 | do | | 95-100 | Nematospiroides dubius. |
| | 20 | Subcutaneous | | 80 | Do. |
| | ([2]) | Drug-diet | | 90 | Ascaris suum larvae. |
| | | | | 100 | Nematospiroides dubius. |
| Sheep | 3.75-10 | Oral drench | | 100 | Haemonchus contortus. |
| | 3.75-10 | do | | 85-99 | Nematodirus sp. |
| | 5-10 | do | | 90-100 | Trichostrongylus axei. |
| | 10 | do | | 94 | Ostertagia circumcincta. |
| | 15 | do | | 100 | Do. |
| | 7.5-10 | do | | 95 | Trichostrongylus colubriformis and Trichostrongylus vitrinus. |
| | 2.5-7.5 | Subcutaneous | | 100 | Haemonchus contortus. |
| | 5-7.5 | do | | 95 | Ostertagia circumcincta. |
| | 2.5-7.5 | do | | 99 | Trichostrongylus colubriformus and Trichostrongylus vitrinus. |
| | 5-7.5 | do | | 97-100 | Nematodirus sp. |
| | 15 | Oral drench | | 99 | Haemonchus contortus larvae. |
| | 15 | do | | 99 | Trichostrongylus colubriformus larvae. |
| | 15 | Subcutaneous | | 87 | Ostertagia circumcincta. larvae. |
| Cattle | 2.5-10 | Oral drench | | 100 | Haemonchus placei. |
| | 7.5-20 | do | + | 80-100 | Trichostrongylus axei. |
| | 7.5-20 | do | | 80-100 | Ostertagi sp. |
| | 5-10 | do | | 100 | Cooperia sp. |
| | 7.5 | do | | 100 | Nematodirus sp. |
| | 5-10 | do | | 100 | Oesophagostomum sp. |
| | 5-10 | Intramuscular or subcutaneous | | 100 | Haemonchus placei. |

TABLE—Continued

| Host | Doses, mg./kg. (or other) | Route of administration | Approximate percent average efficacy | Species of adult [1] nematode |
|---|---|---|---|---|
| Cattle | 5-20 | do | 90+ | *Ostertagia sp.* |
|  | 5-10 | do | 100 | *Cooperia sp.* |
|  | 5-10 | Intramuscular | 100 | *Nematodirus sp.* |
|  | 5-10 | do | 100 | *Oesophagostomum sp.* |
|  | 5-10 | do | 100 | *Bunostomum sp.* |
|  | 7.5 | do | 100 | *Haemonchus placei.* |
|  | 7.5 | do | 80 | *Trichostrongylus axei.* |
|  | 7.5 | do | 90 | *Ostertagia sp.* |
|  | 7.5 | do | 100 | *Cooperia sp.* |
|  | 7.5 | do | 100 | *Nematodirus sp.* |
|  | 7.5 | do | 100 | *Bunostomum sp.* |
| Swine | 5 | Oral capsule or feed | 100 | *Ascaris suum.* |
|  | 10 | In drinking water | 100 | Do. |
|  | 2.5-10 | In drinking water or oral capsule | 100 | *Metastrongylus sp.* |
|  | 10-20 | In drinking water | 85 | *Oesophagostomum sp.* |
|  | [3] | In feed continuously | 95 | *Ascaris suum* larvae. |
| Dog | 5 | Subcutaneous | 99 | *Ancylostoma caninum.* |
|  | 10 | Oral capsule | 90 | *Toxacara canis.* |
|  | 10 | do | 100 | *Toxascaris leonina.* |
| Chicken | 80 | In drinking water | 90+ | *Ascaridia galli* larvae. |

[1] Unless otherwise indicated.
[2] 0.1% in feed.
[3] 0.0125% in feed.

The following examples illustrate in detail the process of preparing substituted imidozothiazoles.

DETAILED DESCRIPTION

EXAMPLE 1 dl α-Phenyl-1-aziridineethanol

To a solution of 43.0 grams (1.0 mole) of ethyleneimine and 60.0 grams (0.5 mole) of styrene oxide is added three drops of water and 0.2 grams of potassium hydroxide. The mixture is heated at reflux for 1½ hours. Distillation of the crude product gives 55.6 grams (68%) of the crystalline product. Recrystallization gives pure α-phenyl-1-aziridineethanol with melting point 74°–76° C.

EXAMPLE 2 dl α-Phenyl-1-aziridineethanol

A solution of 60.0 grams (0.5 mole) of styrene oxide, 50 ml. of ethanol, and 0.2 gram of potassium hydroxide is prepared. To this solution is added 25.9 grams (0.6 mole) of ethylenimine in portions. The mixture is maintained at 29°–30° C. for twenty minutes, and then is heated at reflux for thirty minutes. The solvent is removed under reduced pressure to provide the crude product. Addition of petroleum ether to the residue gives 8.5 grams of product with melting point 53°–63° C. Distillation of the remaining oil gives an additional 30.7 grams of product, melting point 56–65° C., the total yield is 48%.

EXAMPLE 3 dl 2-imino-α-phenyl-3-thiazolidineethanol hydrochloride

To a solution of 1.17 grams (0.012 mole) of potassium thiocyanate in 10 ml. of ethanol is added 0.011 mole of hydrogen chloride in 3 ml. of ethanol. The mixture is warmed to 50° C., cooled, and the precipitated potassium chloride filtered off. The filtrate, which contains 0.011 mole of thiocyanic acid, is added to a solution of 1.63 grams (0.01 mole) of α-phenyl-1-aziridineethanol at a rate sufficient to maintain the reaction temperature at 30°–35° C. After the addition of the thiocyanic acid is complete, the product, dl 2 -[(β - hydroxyphenethyl)amino] ethyl thiocyanate is treated with a solution of 0.015 mole of hydrogen chloride in 5 ml. of ethanol. Removal of the solvent at reduced pressure gives the product, melting point 196°–199° C., in a 95% yield. Recrystallization from ethanol provides the pure product, with melting point 198°–200° C.

EXAMPLE 4 dl 3-(β-chlorophenethyl)-2-iminothiazolidine hydrochloride

To a solution of 6 - phenyl-2,3,5,6-tetrahydroimidazophenyl-3-thiazolidineethanol hydrochloride in 50 ml. of chloroform is added 3 ml. of thionyl chloride. The mixture is refluxed for thirty minutes, and the solvent removed under pressure to give 1.93 grams of solid product.

EXAMPLE 5 dl 6-phenyl-2,3,5,6-tetrahydroimidazo[2,1-b]thiazole

To a solution of 1.30 grams (0.005 mole) of 3-(β-chlorophenethyl)-2-iminothiazolidine hydrochloride in 50 ml. of chloroform is added a solution of 2.76 grams of potassium carbonate in 10 ml. of water. The mixture is heated at reflux for one hour, cooled, and the layers separated. The organic layer is washed with water and dried over potassium carbonate. Removal of the solvent under reduced pressure gives 1.0 grams of impure solid. Crystallization from ether gives the pure product, melting point 90°–92° C.

EXAMPLE 6 dl 6-phenyl-2,3,5,6-tetrahydroimidazo[2,1-b]-thiazolium chloride

To a solution of 6 - phenyl-2,3,5,6-tetrahydroimidazo [2,1-b]thiazole in isopropanol is added a solution of hydrogen chloride in isopropanol. The precipitated hydrochloride is filtered, and washed consecutively with ethanol and ether. The crystalline product has melting point 261°–262° C. with decomposition.

EXAMPLE 7 dl 2-imino-α-phenyl-3-thiazolidineethanol hydrochloride

When α-phenyl - 1-aziridineethanol is mixed with a stoichometric quantity of thiourea in the presence of hydrochloric acid the product obtained is dl 2{2[(β-hydroxyphenylethyl)amino]ethyl}-2 - thiopseudourea. The latter product on heating produces the product.

EXAMPLE 8 dl 2-phenyl 2,3,5,6-tetrahydroimidazo[2,1-b]thiazolium chloride

One gram (0.036 mole) of 3-(β-chlorophenethyl)-2-iminothiazolidine hydrochloride is partitioned between 50 ml. of ethylacetate and a solution of 2.34 g. (0.017 mole)

of potassium carbonate in 32 ml. of water. The ethylacetate layer is separated and heated at reflux temperature for 2½ hours The precipitate of 6-phenyl 2,3,5,6-tetrahydroimidazo[2,1-b]thiazolium chloride is collected by filtration and recrystallized from absolute ethanol to yield 0.3 g. of pure product, melting point 257°–259° C.

I claim:

1. A compound selected from the group consisting of dl 2{2[(β - hydroxyphenethyl)amino]ethyl} - 2-thiopseudourea and the hydrochloride salt thereof.

References Cited

Chemical Abstracts, vol. 54, 12090a.

BERNARD HELFIN, Primary Examiner

G. A. SCHWARTZ, Assistant Examiner

U.S. Cl. X.R

260—306.7, 999

Notice of Adverse Decision in Interference

In Interference No. 98,765, involving Patent No. 3,547,996, M. W. Bullock, DI-2-{2-[(β-HYDROXYPHENETHYL)AMINO]ETHYL}-2-THIOPSEUDOUREA AND HYDROCHLORIDE SALT THEREOF, final judgment adverse to the patentee was rendered Jan. 24, 1975, as to claim 1.

[*Official Gazette May 6, 1975.*]